United States Patent [19]

Park et al.

[11] Patent Number: 5,612,440
[45] Date of Patent: Mar. 18, 1997

[54] POLYMERIC ORIENTATING MATERIAL AND FERROELECTRIC LIQUID CRYSTAL DISPLAY ADOPTING THE SAME

[75] Inventors: Jae-keun Park; Jong-cheon Lee, both of Suwon, Rep. of Korea

[73] Assignee: Samsung Display Devices Co., Ltd., Kyungki-do, Rep. of Korea

[21] Appl. No.: 470,696

[22] Filed: Jun. 6, 1995

[30]   Foreign Application Priority Data

Aug. 27, 1994 [KR]   Rep. of Korea ..................... 94-21307

[51] Int. Cl.⁶ .................................................... C08G 18/30
[52] U.S. Cl. ............................... 528/71; 528/85; 528/173; 252/299.67; 252/299.64; 428/1
[58] Field of Search ................................ 528/71, 85, 173; 252/299.67, 299.64; 428/1

[56]   References Cited

U.S. PATENT DOCUMENTS 5,227,456   7/1993   Shepherd .................................. 528/173

Primary Examiner—Rachel Gorr
Attorney, Agent, or Firm—Rothwell, Figg, Ernst & Kurz, P.C.

[57]   ABSTRACT

A polymeric orientating material for a liquid crystal display including a charged pair electrostatically bound to the main chain of the polymer, and a ferroelectric liquid crystal display adopting the same as an orientation. The ferroelectric liquid crystal display of the present invention has improved memory stability through fast reduction of the anti-electrical field formed when an external electrical field is applied.

12 Claims, 1 Drawing Sheet

POLYMERIC ORIENTATING MATERIAL AND FERROELECTRIC LIQUID CRYSTAL DISPLAY ADOPTING THE SAME

FIELD OF THE INVENTION

The present invention relates to a novel polymeric orientating material having both hydrophilic and hydrophobic functions in one molecule and to a ferroelectric liquid crystal display (FLCD) having improved memory stability by adopting an orientation layer formed by using such a polymeric orientating material.

BACKGROUND OF THE INVENTION

Recently, according to the trend of display devices becoming lighter and smaller, a low energy consuming LCD is being actively developed. The most widely used LCD until now are either the simple matrix type super twisted nematic (STN) LCD using nematic liquid crystal which is passively driven, or the active matrix type twisted nematic (TN) LCD which is driven by semiconductor device. However, these have a slow response time and limitation in displaying images of a large capacity and high density.

In 1971, ferroelectric liquid crystal was first obtained which had a chiral carbon in its molecular structure and exhibited a chiral smectic phase (Sc*). Owing to spontaneous polarization due to a vertical polar moment acting on the surface of the molecules, ferroelectric liquid crystal has a very fast response time and bistability giving its good memory characteristics. Accordingly, a display of virtually any size can be made by using a simple driving method.

Since the spontaneous polarity of the ferroelectric liquid crystal dissipates in a bulk state, appropriate surface treatment is carried out when it is applied to a display.

The concept of a surface stabilized ferroelectric LCD can prevent the dissipation of the spontaneous polarity. To obtain surface stabilization, the thickness of liquid crystal cell should be adjusted to 1.5~2 μm and the surface interaction energy of the liquid crystal is appropriately adjusted by coating and rubbing a polymeric orientating material on the transparent electrode.

When external voltage is applied to the liquid crystal molecules having the spontaneous polarity, the polarity tends to shift to the direction parallel to the electrical field. Accordingly, an electric charge is induced on both sides of a liquid crystal layer, so that an internal electrical field (i.e., an anti-electrical field) is generated in the reverse direction of the external electrical field. The anti-electrical field plays the role of changing the direction of the spontaneous polarization to the original direction. This significantly deteriorates the memory characteristics of the liquid crystal and hence degrades the contrast ratio of the display device. However, since the spontaneous polarity is followed by the generation of the anti-electrical field, a fast removal thereof is required.

An orientation layer formed by coating common polymeric orientating material, including the widely used polyimide, is too thick and its insulating effect is too large. Accordingly, the anti-electrical field remains for too long of a time period when compared with the reversing time of the spontaneous polarity. Recently, methods using ultra thin films such as LB for the orientation layer, mixing charge transferring complexes with the liquid crystal mixture, and adding conductive polymer to the orientating material, etc. have been suggested to solve the above problem. Among these methods, it is preferable to use a material having a charge on the surface since the anti-electrical field formed when electrical field is applied thereto dissipates rapidly and the phenomena of memory characteristic deterioration can be prevented.

SUMMARY OF THE INVENTION

An object of the present invention is to provide a polymeric orientating material having charge in its molecules to ensure bistability of the ferroelectric liquid crystal and to rapidly dissipate the anti-electrical field formed when an electrical field is applied.

Another object of the present invention is to provide a liquid crystal display having improved memory stability characteristics by adopting a polymeric orientating material having charge in its molecules as an orientation layer.

To accomplish the object, there is provided in the present invention a polymeric orientating material for a liquid crystal display comprising a charged pair electrostatically bound to the main chain of the polymer.

Another object of the present invention is accomplished by a liquid crystal display adopting a polymeric orientating material comprising a charged pair which is electrostatically bound to the main chain of the polymer as an orientation layer.

Particularly, at least one compound selected from the group consisting of the following compounds is preferably used as the polymeric orientating material.

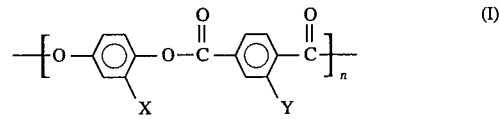

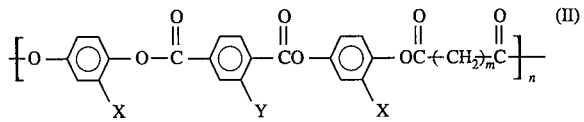

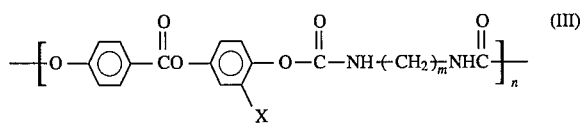

wherein, n is an integer of 10 or more, m is an integer of 5–10, X is —$SO_3^-K^+$ or —$SO_3^-Na^+$ and Y is Cl, Br, $NO_2$ or H.

Polymeric orientating material having both hydrophilic and hydrophobic portion is dissolved in water or an appropriate polar organic solvent to show the liquid crystalline phase. The polymeric orientating material of the present invention contains hydrophilic and hydrophobic portions as an ion pair. Since the ions form a charged pair and are bound stably to the main chain of the polymer through electrostatic force, the anti-electrical field formed when the electrical field is applied is rapidly dissipated and the deterioration of the memory characteristics can be prevented.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE PREFERRED EMBODIMENTS

Figure 1:
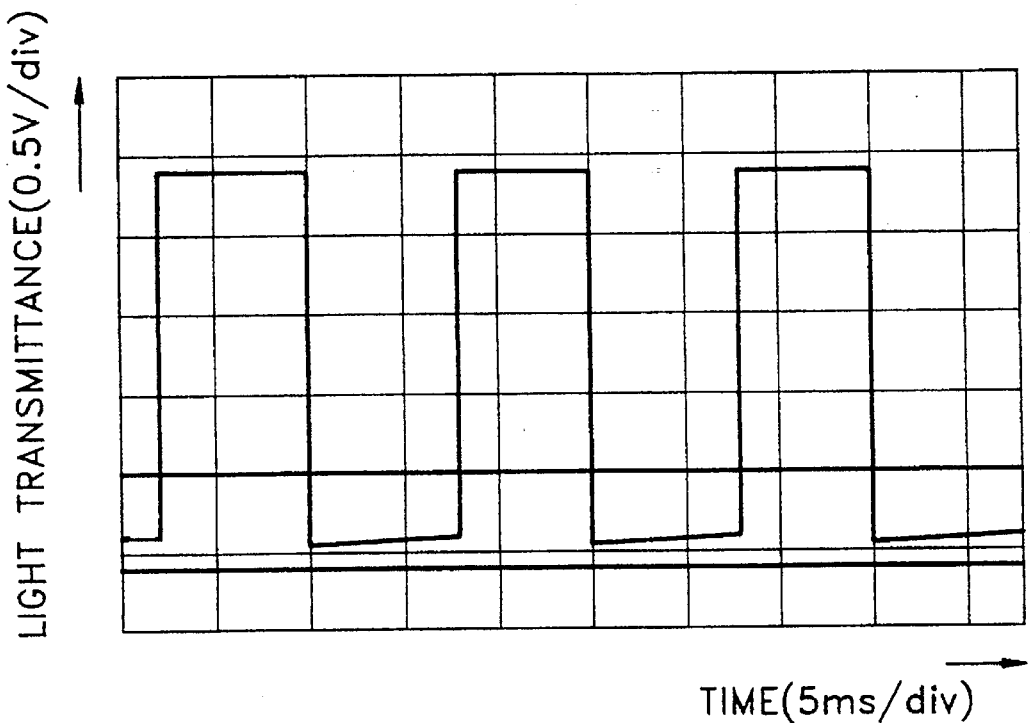
FIG. 1 is a graph illustrating memory stability of a liquid crystal cell manufactured by an embodiment of the present invention.

The present invention will be described in detail referring to the preferred embodiment, hereinbelow. However, the present invention is not limited to these examples.

Example 1

Preparation of 2-Nitroterephthaloyl Chloride 2 g of 2-nitroterephthalic acid and 13 g of thionyl chloride were mixed and refluxed for 6 hours. After reaction, the product was obtained through distillation under vacuum.

yield: 85%, b.p.: 180° C. (1 mmHg)

Example 2

Preparation of 2-Bromoterephthaloyl Chloride

A mixture of 3 g of 2-bromoterephthalic acid and 29 g of thionyl chloride was refluxed for 15 hours while heating. After reaction, the residual thionyl chloride was removed by vacuum distillation using a rotational vacuum evaporator to obtain the product.

yield: 90%, b.p.: 130° C. (0.2 mmHg)

Example 3

Preparation of Poly(Sulfo-P-Phenylene Nitroterephthalate) (Orientating Material 1)

0.53 g of sodium hydroxide, 1.53 g of potassium hydroquinonesulfonate and 5 ml of distilled water were added in a three-necked 100 ml flask and a mechanical stirrer was provided. The mixture was stirred under nitrogen gas to obtain dark brown solution. 1.63 g of 2-nitroterephthaloyl chloride dissolved in 30 ml of chloroform was added at once. 0.3 g of benzyltriethyl ammonium was added and the mixture was vigorously stirred. With formation of precipitation the color of the mixed solution changed from brown to greenish brown. After about 10 minutes, the solution changed to gray. When the solution changed into clear brown, 400 ml of methanol was added to the solution to form a precipitate. The solid product was filtered, washed with methanol and dried under vacuum.

yield: 34%, inherent viscosity (DMSO/water=½, 0.1% LiCl): 0.45 dl/g

Example 4

Preparation of Poly(Sulfo-P-Phenylene Bromoterephthalate) (Orientating Material 2)

The procedure was carried out as described in example 3, except that 1.853 g of 2-bromoterephthaloyl chloride was used instead of 1.63 g of 2-nitroterephthaloyl chloride to obtain the orientating material 2.

yield: 45%, inherent viscosity: 0.27

Example 5

Preparation of Poly(Sulfo-P-Phenyleneterephthalate) (Orientating Material 3)

The procedure was carried out as described in example 3, except that 1.33 g of terephthaloyl chloride was used instead of 1.63 g of 2-nitroterephthaloyl chloride to obtain the orientating material 3.

yield: 53%, inherent viscosity: 0.48

Example 6

Preparation of Orientating Material 4

2.0 g (12 mmol) of terephthalic acid was dissolved in 20 ml of pyridine and this solution was mixed with 3 ml of thionyl chloride and 40 ml of pyridine. The mixture was stirred for 20 minutes at an ambient temperature. 4.63 g (12 mmol) of 1,10-bis(4-hydroxy-2-potassium sulfonate phenyl)decanedioate dissolved in 20 ml of pyridine was added to the solution. This mixture was vigorously stirred at 80° C. under nitrogen for 20 hours. After completion of synthesis, the reaction mixture was re-precipitated using methanol in excess. The precipitate was washed with of 1M HCl. The product was extracted using soxlet extractor and ethanol for 3 days. The yield of the extracted polymer was 82%.

Example 7

Preparation of 4-Hydroxyphenyl-4-Hydroxybenzoate (4HPH4HB)

The titled product was prepared by direct esterification of hydroxyquinone sulfonic acid and p-hydroxybenzoic acid in petroleum ether using boric acid as a catalyst.

Example 8

Preparation of Orientating Material 5

0.036 mol of 4HPH4HB was dissolved in 30 ml of methyl ethyl ketone and this solution was slowly dropped into 0.038 mol of hexamethylenediisocyanate. Polymerization proceeded with vigorous stirring for 3.5 hours. Before 10 minutes of the completion of the polymerization, stannous octoate diluted in acetone in a 10:1 ratio was added as a reaction catalyst. The reaction mixture was re-precipitated by adding water and the precipitate was filtered and completely dried to obtain orientating material 5.

Examples 9~13

Orientating materials 1~5 were dissolved in dimethylformamide in 1~3 wt % concentration-to obtain reddish solutions, respectively. Each solution was coated on transparent electrode of ITO (indium-tin oxide) formed on coated glass (Corning glass 7059) using a spin-coater to a thickness of 1000 Å. The coating was carried out at 300 rpm for 5 seconds and then at 3000 rpm for 20 seconds. The orientation layer coating was completed by standing on a heat plate at 150° C. for 20 minutes and completely drying. The orientation layer was appropriately rubbed using a cloth and a void cell having 2.0 μm gap between upper and lower substrates using glass spacers of 2.0 μm diameter was manufactured. The edge portions of the void cell were sealed using epoxy sealant. One side of the cell was not sealed for injection of liquid crystal.

Ferroelectric liquid crystal, ZLI-4655 (Merck Co.) was injected using liquid crystal injection equipment at 80° C. at which temperature the liquid crystal has anisotropic properties. After injection, the temperature was slowly lowered at a rate of 1° C./min to an ambient temperature. Light transmittance, contrast ratio and memory stability were measured while applying appropriate wave-forms using polarizing microscope.

Comparative Example 1

Polyvinyl alcohol (molecular weight 20,000) was diluted in water to 1 wt % concentration. An orientation layer of about 1000 Å thickness was formed using the spin coater as in the above example and was dried at 110° C. for 10 minutes to completely remove water. A void cell was manufactured as in examples 9~13 and characteristics of the LCD were measured.

Comparative Examples 2~3

An orientation layer was manufactured by the same method described in comparative example 1 except using solutions of polyimide and polyester, dissolved in N-methyl pyrrolidone and 4-chlorophenol in 1 wt % concentration, respectively, instead of polyvinyl alcohol and a liquid crystal cell was manufactured.

Contrast ratio and light transmittance of each orientating material of each cell manufactured according to the examples and comparative examples are illustrated in Table 1.

TABLE 1

| | electro-optic characteristics of each orientating material | | |
|---|---|---|---|
| | orientating material | contrast ratio | light transmittance (%) |
| example 9 | orientating material 1 | 12:1 | 100.0 |
| example 10 | orientating material 2 | 10:1 | 99.5 |
| example 11 | orientating material 3 | 12:1 | 100.0 |
| example 12 | orientating material 4 | 13:1 | 100.0 |
| example 13 | orientating material 5 | 10:1 | 100.0 |
| comparative example 1 | polyvinyl alcohol | 7:1 | 80.0 |
| comparative example 2 | polyimide | 8:1 | 95.0 |
| comparative example 3 | polyester | 8:1 | 90.0 |

From the results shown in Table 1, it is confirmed that the LCD of the present invention manufactured by using the polymeric orientating material of the present invention has higher contrast ratio and light transmittance.

Memory stability was evaluated as follows.

First, the cells having ferroelectric liquid crystal injected therein according to the examples 9 and 13 were stabilized by applying an electrical field at an ambient temperature. A bipolar square wave of 15 V and 30Hz was applied for 10 minutes.

After stabilization, a bipolar square wave of 25 V, 30Hz was applied and dark and white states of the cell were repeated periodically according to the change in polarity of the applied electrical field. Memory stability was evaluated by measuring changes in light transmittance after it reached a maximum value.

Figure 2:
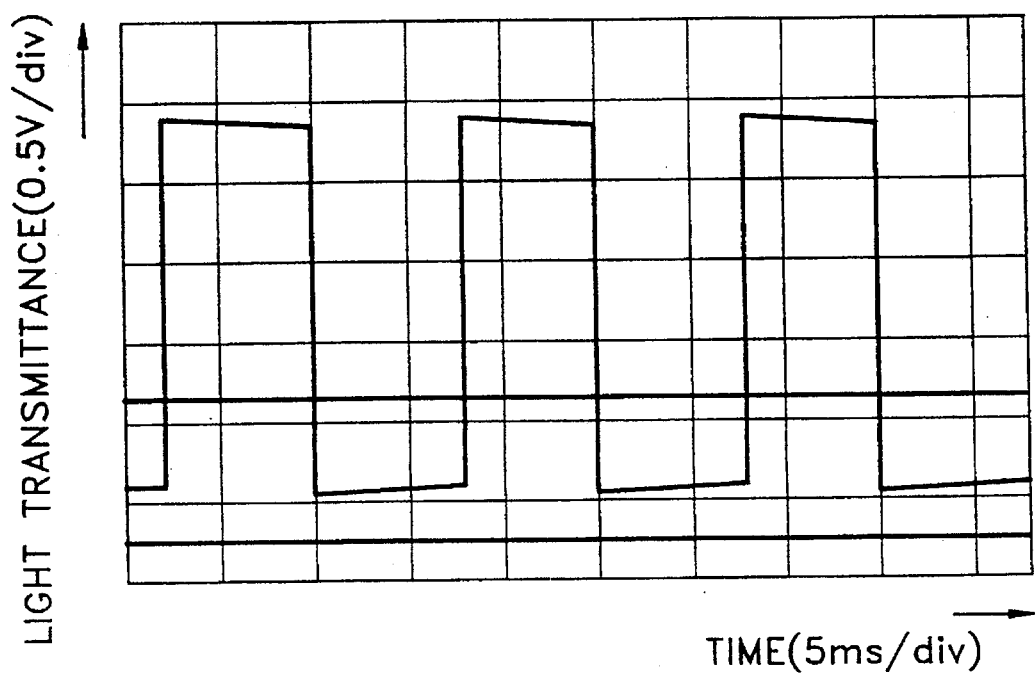
FIG. 2 is a graph illustrating memory stability of a liquid crystal cell manufactured by another embodiment of the present invention.

The memory stability was measured for the cells manufactured by using orientating material 1 and orientating material 4. The results are illustrated in FIG. 1 and FIG. 2, wherein FIG. 1 corresponds to the cell using the orientating material 1 and FIG. 2 corresponds to the cell using the orientating material 4 (applied voltage; 25Vp, pulse width; 1msec, period; 16.7 msec and temperature; 25° C.). From the results of evaluating memory stability, it is confirmed that light transmittance change measured after maximum was almost 0%.

As described above, the polymeric orientating material according to the present invention is prepared by using an aqueous polymer having an ion pair. The ferroelectric LCD manufactured adopting the polymeric material as an orientation layer has improved memory stability through fast reduction of the anti-electrical field formed when an external electrical field is applied.

What is claimed is:

1. A polymeric orientating material for use in a liquid crystal display, wherein said material is comprised of at least one compound selected from the group consisting of the following polymer compounds:

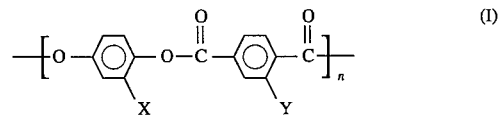

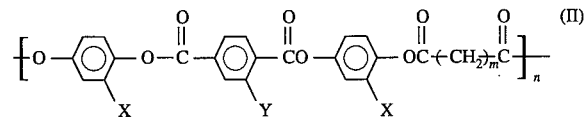

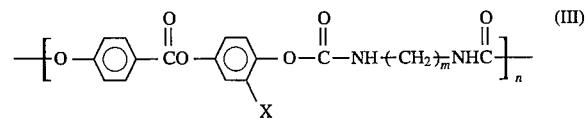

wherein, n is an integer of 10 or more, m is an integer of 5–10, X is $—SO_3^-K^+$ or $—SO_3^-Na^+$ and Y is Cl, Br, $NO_2$ or H.

2. The polymeric orientating material as claimed in claim 1, [Having the formula of (i), $NO_2$ as Y and $—SO_3^{-K+}$ as X] wherein the polymeric material is represented by formula (I), Y is $NO_2$ and X is $—SO_3^-K^+$.

3. The polymeric orientating material as claimed in claim 1, [having the formula of (I), Br as Y and $—SO_3^{-K+}$ as X] wherein the polymeric material is represented by formula (I), Y is Br and X is $—SO_3^{-K+}$.

4. The polymeric orientating material as claimed in claim 1 [having the formula of (I), H as Y and $—SO_3^-K^+$ as X] wherein the polymeric material is represented by formula (I), Y is H and X is $—SO_3^-K^+$.

5. The polymeric orientating material as claimed in claim 1 [having the formula of (II), H as Y, $—SO_3^-K^+$ as X and 10 as m] wherein the polymeric material is represented by formula (II), Y is H, x is $—SO_3^-K^+$ and m is 10.

6. The polymeric orientating material as claimed in claim 1, [having the formula of (III), $—SO_3^{-K+}$ as X and 6 as m] wherein the polymeric material is represented by formula (III), X is $—SO_3^-K^+$ and m is 6.

7. A ferroelectric liquid crystal display comprising a polymeric orientating material, wherein said material is comprised of at least one compound selected from the group consisting of the following compounds:

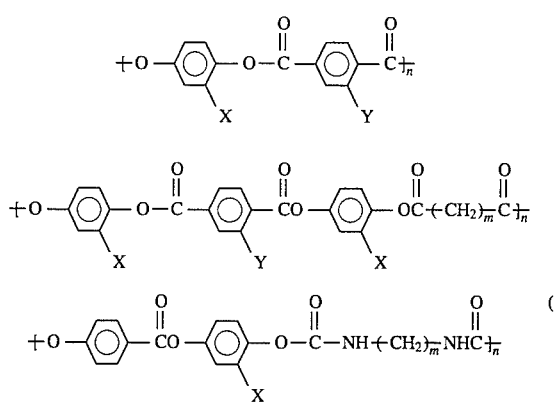

wherein, n is an integer of 10 or more, m is an integer of 5–10, X is —SO$_3^-$K$^+$ or —SO$_3^-$Na$^+$ and Y is Cl, Br, NO$_2$ or H.

8. A ferroelectric liquid crystal display as claimed in claim 7, wherein the polymeric material is represented by formula (I), Y is NO$_2$ and X is —SO$_3^-$K$^+$.

9. A ferroelectric liquid crystal display as claimed in claim 7, wherein the polymeric material is represented by formula (I), Y is Br and X is —SO$_3^-$K$^+$.

10. A ferroelectric liquid crystal display as claimed in claim 7, wherein the polymeric material is represented by formula (I), Y is H and X is —SO$_3^-$K$^+$.

11. A ferroelectric liquid crystal display as claimed in claim 7, wherein the polymeric material is represented by formula (II), Y is H, X is —SO$_3^-$K$^+$ and m is 10.

12. A ferroelectric liquid crystal display as claimed in claim 7, wherein the polymeric material is represented by formula (III), X is —SO$_3^-$K$^+$ and m is 6.

* * * * *